May 15, 1951  C. H. MINER  2,553,505
CENTRIFUGALLY CONTROLLED DEVICE
Filed March 17, 1949
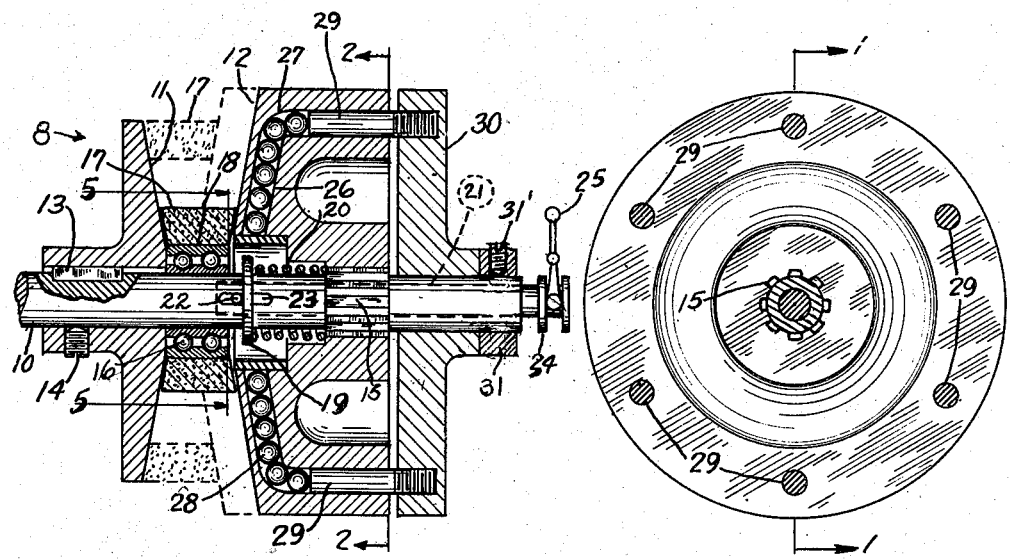
Fig.1.  Fig.2.
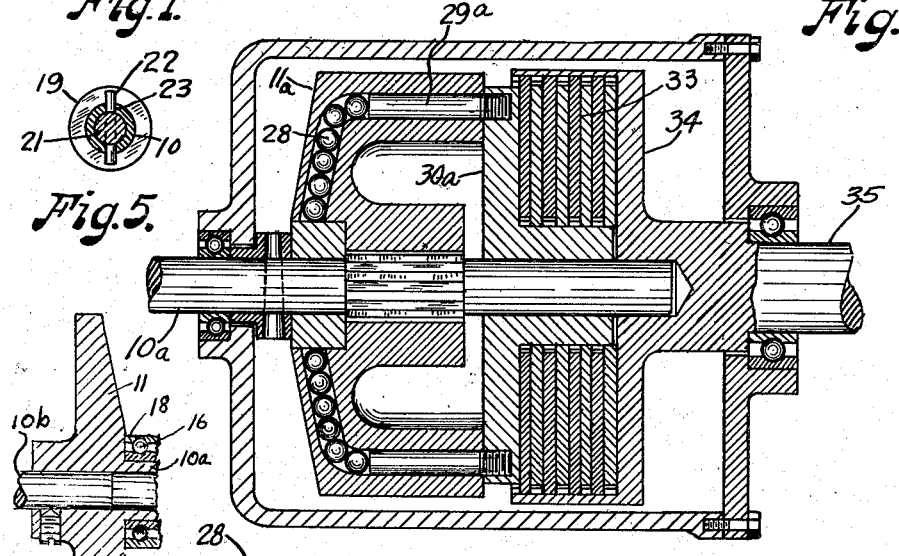
Fig.5.
Fig.3.
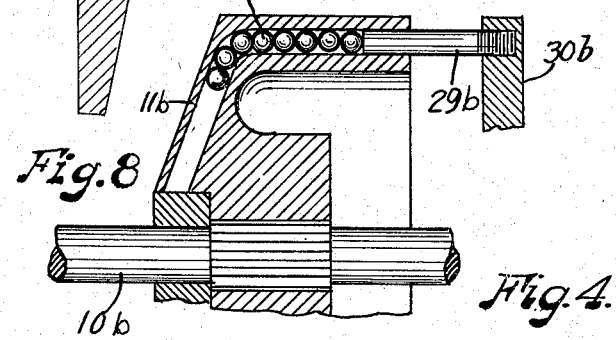
Fig.8.
Fig.6.
Fig.7.
Fig.4.
INVENTOR.
Charles H. Miner
BY
Martin E. Anderson
ATTORNEY Patented May 15, 1951

2,553,505

UNITED STATES PATENT OFFICE 2,553,505

CENTRIFUGALLY CONTROLLED DEVICE

Charles H. Miner, Denver, Colo.

Application March 17, 1949, Serial No. 81,909

12 Claims. (Cl. 74—230.17)

This invention relates to centrifugally controlled power transmission devices.

In certain types of power transmission systems the torque of the prime mover, such as an internal combustion engine or an electric motor, is relatively low at low speeds and increases as the prime mover increases its speed. Thus, gasoline engines such as used in automobiles, motorcycles, and the like, have a torque-speed curve wherein the torque increases somewhat in direct proportion to angular velocity. Similarly, certain types of electric motors have low starting torque and in order to bring a driven load up to a desired speed it is necessary to provide a larger motor than necessary for rated load conditions in order that the rated load speed may be achieved. In automobiles, for example, it is customary to provide selective speed transmissions so that suitable acceleration of the vehicle may be achieved, or to provide sufficient power to operate the vehicle under certain driving conditions, such as starting the automobile into motion, the transmission permitting the engine to operate at higher speeds where it develops greater torque. As the automobile gains momentum the ratio between the engine and wheels is reduced by steps with the transmission. One form of the invention herein disclosed relates to transmission devices for this purpose, although certain of the principles employed have wider application as will hereinafter appear.

One of the objects of the invention is to provide a belt transmission device which automatically changes the ratio between driver and driven elements in response to change in speed, the change occurring in infinitesimal increments.

Another object is to provide a belt transmission device of the foregoing type wherein the driven element is automatically disconnected, or declutched, from the driver below a predetermined speed of the latter.

Another object is to provide a system of pulleys wherein the driver pulley increases in pitch diameter in response to increase in speed, resulting in a higher ratio between driver and driven pulleys at higher speeds.

Another object is to provide a variable speed transmission in which the ratio between driver and driven elements may be selected for a given speed of the driver element.

Another object is to provide a V-belt sheave, which in one position, disconnects a V-belt therefrom, and in other positions provides a pulley of variable pitch diameter, depending upon pulley speed.

Another object is to control the size of the pitch diameter of a V-belt sheave by the centrifugal force exerted by a train of contacting spherical members.

A further object is to centrifugally actuate a plurality of spherical members in such manner that the centrifugal forces acting on certain of them becomes ineffective to produce a force on one end of the train, at certain speeds of operation.

Further objects, advantages, and salient features will become more apparent from a consideration of the description to follow, the appended claims, and the accompanying drawing, in which:

Figure 1 is a cross section of a variable ratio drive pulley taken on line 1—1, Figure 2;

Figure 2 is a section taken on line 2—2, Figure 1;

Figure 3 is a cross section through an alternative application of the invention, a centrifugal actuator being employed to control a clutch;

Figure 4 is a cross section through a centrifugal actuator utilized for general application;

Figure 5 is a section taken on line 5—5, Figure 1;

Figure 6 is a diagrammatic view of a belt transmission system driving at one ratio;

Figure 7 is a similar view in another ratio; and

Figure 8 is a fragmentary sectional view of a modified form of the invention.

Referring in detail to the drawing and particularly to Figures 1 and 2, the variable ratio pulley 8 comprises a shaft 10, one end of which may be secured to a prime mover, such as a gasoline engine, electric motor, or the like, and a pair of tapered flanged members 11, 12, the former being secured to the shaft by a key 13 and set screw 14, and the latter being slidable along the shaft on splines 15 integral with shaft 10.

A ball bearing 16 is mounted on shaft 10 between the two flanged members and in the full line position, as shown in Figure 1, provides an abutment on which belt 17 may rest when the belt is declutched from the flanged members. In this position the outer race 18 of the bearing remains stationary and the shaft and balls rotate within it. When flanged member 12 moves toward member 11, the belt moves outwardly away from the bearing to a clutched position and the speed of the belt will increase depending upon the relative position of the two flanged members. The dotted line position of the belt and flanged member 12 indicates the position where the belt speed is at a maximum.

The position and speed of the belt is controlled in response to the speed of shaft 10 by a construction to now be described. A washer 19, slidable on shaft 10, is disposed adjacent bearing 16 and abuts one end of a spring 20, the other end of the spring abutting the flanged member to urge it to the right in Figure 1. The length of this spring and hence the force that it exerts on flanged member 12, is controlled by a shaft 21 slidable axially within shaft 10, one end of this shaft having a cross pin 22 secured thereto which projects through opposed slots 23 to engage the left side of washer 19, and the other end carrying a suitable grooved member 24, which may be moved to a desired position by any suitable yoke and lever construction 25.

The flanged member 12 is provided with a plurality of cylindrical channels 26, shown slightly inclined to a radial direction, which join at their outer ends, with horizontal cylindrical channels 27. A plurality of contacting balls 28 are disposed in each of the channels to form a train, one end of each train abutting a pin 29 affixed to a disk 30, secured to shaft 10 against axial movement in any suitable manner such as by collar 31 and set screw 31'. Six evenly spaced trains of balls and pins are shown, although it is to be understood that any number may be employed. At least two trains should be used and be evenly spaced so that the pulley will remain in dynamic balance. As will be apparent, the channels form guide means for restraining the movement of the balls along the directions of the channels.

As previously stated, the pulley so far described has many applications; as an example, its operation will be described in a drive for a vehicle, such as an automobile. If so employed, the pulley 8 is connected to an end of the engine crankshaft and joined by a suitable heavy duty V-belt to a second pulley 32 (see Figs. 6 and 7), which preferably may automatically change its pitch diameter as the drive pulley changes in pitch diameter. Pulleys of this type are well known and no detailed description is deemed necessary. In one type, the pulley flanges are merely spring urged toward each other and as the drive pulley changes its pitch diameter, the flanges on the driven pulley move together or apart. The pitch diameter referred to may be defined approximately as the diameter of the inner surface of the belt where it passes over a pulley plus one thickness of the belt. In other words, the pitch circle coincides approximately with the center line of the belt. The driven pulley mentioned is then connected in any suitable manner with the driving wheels of the vehicle.

The spring 20 is so chosen that when the engine is idling the belt will ride on bearing race 18, the engine then being declutched from the driving wheels. As the engine is sped up, as in starting the vehicle, the centrifugal force of the balls moves flange member 12 toward member 11, thus drivingly engaging the belt, the relative pitch diameters of the pulleys 8 and 32 being as shown in Figure 6, this being analogus to "low" gear in the automobile. As the vehicle gains momentum and the engine speeds up further, the pitch diameter of pulley 8 increases and the pitch diameter of pulley 32 decreases until finally a "high" ratio is obtained, as shown in Figure 7. If it be desired to adjust the particular ratio between the engine and driving wheels at a particular engine speed, this is achieved simply by manipulating lever 25 to adjust spring 20. It is apparent therefore that the speed ratio not only changes by infinitesimal increments of engine speed change, but also the ratio at a particular engine speed may be selected.

In Figure 3 is shown another application of the invention wherein the member 11a is affixed to a shaft 10a and the balls 28 actuate, by centrifugal force, pins 29a which are secured to pressure plate 30a which forces plates 33 of clutch 34 together, thus driving shaft 35 when the clutch plates become engaged. This construction will find utility in electric motors, for example, where it is desired to "pick up" or clutch the load only after the motor has attained a predetermined speed of rotation.

In Figure 4 is shown a general application of the invention wherein the trains of balls are utilized to actuate any control member 30b which it is desired to actuate in response to speed changes of shaft 10, such for example, as a governor. Member 11b may be fixed to the shaft 10b and controlled element 30b slidable thereon or vice versa.

It is to be observed that certain of the balls move into a channel 27 parallel with the axis of rotation under centrifugal force. While these balls still produce a centrifugal force, this force has no component in the direction parallel with the axis and therefore they loose their control effect on rods 29. The balls remaining in the channels 26 still produce a centrifugal force which is transmitted through the chain of balls to control movement of rods 29. This construction provides a manner in which the centrifugal force and its controlling effect may be limited at certain speeds as distinguished from constructions wherein the centrifugal force continues to increase with increase in speed. This is desirable because the controlling centrifugal force is required only up to certain limiting speeds after which further control or movement of a member in response to centrifugal force is not desired. The equation for centrifugal force is $$F = \frac{MV^2}{R}$$

where F is the centrifugal force, M is the mass of the rotating body, R the radius from the axis of rotation to its centroid and V is the linear velocity. In the present application of this relationship, as speed increases, the effective mass to produce a controlling effect on rods 29 decreases simultanteously with an increase of radius of its centroid. It is apparent therefore that with increase in speed all three of the variants are involved in the controlling force of the chain of balls. As an illustration of the foregoing, suppose that the number of balls be chosen so that at the limit of movement of the controlled element only one ball remains in channel 26. The mass then becomes fixed, the radius to its centroid fixed, and increased force becomes proportional to the square of the velocity of the single ball. This, of course, limits the controlling force to the effect produced by a relatively small mass rather than the larger mass prior to the time the mass of balls moved outwardly to leave but a single ball to produce the controlling effect. In the conventional centrifugal device, on the contrary, such as a flyball governor, the balls move to a greater radius with increased speed but the mass remains constant. This device is to be distinguished from constructions of this kind since the effective mass of the moving body to produce a control force is continuously decreasing with increase in speed.

While the channels 26 have been shown inclined it is apparent that they may be radial, if desired, or at any other angle of inclination. The angle shown is convenient for production reasons since the holes may readily be drilled from their inner ends. The manner in which the holes are formed, is, of course, immaterial and curved tubes cast in the metal or any other manner of fabricating the channels may be employed.

The pulley has been described as the driver pulley but it will become apparent that it may also be employed as the driven pulley.

In Figure 8 a slight modification of the invention is shown wherein flanged member 11 is formed integral with shaft 10a and shaft 10b fits within the flange 11 and shaft 10b. With this construction the bore for shaft 10b may be selected as desired to fit various size shafts.

Many modifications will become apparent within the spirit of the invention and it is not desired to limit the invention to the specific embodiments disclosed except as defined within the scope of the appended claims.

Having described the invention, what is claimed as new is:

1. A variable ratio pulley, comprising, a pair of axially aligned members having juxtaposed faces of a shape to engage the sides of a V-belt therebetween, the width of the faces in a radial direction being substantially in excess of the thickness of the belt, means connecting the members together in a manner such that they rotate in unison, but are relatively movable axially, resilient means urging the members away from each other, means rotatable with the pulley responsive to centrifugal force for moving the members toward each other to various predetermined positions in accordance with the speed of rotation, whereby the effective pitch diameter of the pulley may be increased in response to increase in speed, the last named means including a channel in one of the axially aligned members extending outwardly from the axis of the pulley, joined at its outer end to a channel extending parallel with the axis, and a plurality of contacting members movable within the channels, said contacting members having a fixed mass, the centrifugal force on a portion of which becomes ineffective to produce movement of the members at certain speeds.

2. A variable ratio pulley in accordance with claim 1 including means for varying the force exerted by the resilient means while the pulley is rotating, whereby the effective pitch diameter of the pulley may be varied at a predetermined speed of rotation thereof.

3. A pulley in accordance with claim 1 wherein the contacting members are composed of spherical balls, adapted to move in the channels in a manner such that each ball contacts an adjacent ball to form a chain through which force may be exerted, the end ball in the horizontal channel applying a controlling force substantially equal to the centrifugal force of a ball or balls disposed in the outwardly extending channel.

4. A centrifugal responsive controlling device, comprising, a rotatable member, a channel extending outwardly from the axis of rotation of the member joined at its outer end to a channel extending parallel with the axis, a mass of fixed weight movable within the channels, the outer end of the mass being adapted to apply a controlling force, the construction being such that only the mass within the outwardly extending channel is effective to produce the controlling force.

5. A variable ratio pulley, comprising, a pair of axially aligned members having juxtaposed frusto-conical faces for receiving a V-belt therebetween, the width of the faces in a radial direction being substantially in excess of the thickness of the belt, an idler pulley disposed axially between the members upon which the belt may rest in disconnected relation to the members when the pulley rotates below a predetermined speed, means connecting the members together in a manner such that they rotate in unison but are relatively movable axially, sufficient range of movement being provided so that one of the members may telescope over the idler pulley, resilient means urging the members away from each other, means rotatable with the pulley responsive to centrifugal force for moving the members toward each other to various predetermined positions, depending upon the speed of rotation, whereby the effective pitch diameter of the pulley may be appreciably increased in response to increase in pulley speed, the last named means including a cylindrical channel in one of the axially aligned members extending outwardly from the axis of the pulley, joined at its outer end to a channel extending parallel with the axis, and a chain of contacting spherical balls disposed to move in the channels, the end ball in the horizontal channel applying a controlling force substantially equal to the centrifugal force of a ball or balls disposed in the outwardly extending channel.

6. A pulley in accordance with claim 5 wherein at least two sets of channels and chains of balls are provided in the pulley, arranged in a manner such that the pulley remains in dynamic balance.

7. A pulley in accordance with claim 6 wherein pins are provided extending into the outer ends of the horizontal channels, one end of each pin engaging an end ball in a chain, the other end of the pin being fixed against axial movement relative to one of said axially aligned members.

8. A variable ratio pulley, comprising, a shaft, one end of which is adapted to be connected to a rotatable member, a frusto-conical flanged member secured to the shaft, a ball bearing on the shaft adjacent the flanged member, a second frusto-conical member facing the first member in a manner to provide a V pulley, the second member being rotatable with the shaft and slidable thereon, a recess being provided therein whereby it may telescope over the ball bearing, a spring interposed between the ball bearing and second member for urging the latter away from the first member, an outwardly extending channel in the second member joined at its end by a horizontal channel, a chain of balls disposed in the channels, a pin extending into the outer end of the horizontal channel, and means for securing the pin to the shaft in fixed relation to the first flanged member.

9. A pulley in accordance with claim 8 wherein an abutment is provided adjacent one end of the spring, the position of which is controlled by means within the shaft extending beyond one end thereof.

10. A centrifugal responsive controlling device, comprising, a rotatable member having guide means extending outwardly from its axis of rotation and joined at the outer end thereof to second guide means extending in a direction angularly related to the direction of the first guide means, a mass of fixed weight movable along both guide means forming a chain through which force may be exerted, the outer end of the chain being adapted to apply a controlling force, the angular relationship of the two guide means being such that the controlling force is substantially equal to the centrifugal force exerted by only that portion of the mass disposed along the first named guide means when the member is rotating with portions of the mass disposed along both guide means.

11. A variable ratio pulley, comprising, a pair of axially aligned members having juxtaposed faces of a shape to engage the sides of a V-belt therebetween, the width of the faces in a radial direction being substantially in excess of the thickness of the belt, means connecting the members together in a manner such that they may rotate in unison and move relatively axially, and means rotatable with the pulley for effecting the axial movement, including; guide means extending outwardly from the axis of the pulley joined at the outer end thereof to guide means extending substantially parallel with the axis, and a plurality of contacting members having a fixed mass movable along the guide means.

12. A variable ratio pulley, comprising, a pair of axially aligned members having juxtaposed faces of a shape to engage the sides of a V-belt therebetween, the width of the faces in a radial direction being substantially in excess of the thickness of the belt, means connecting the members together in a manner such that they rotate in unison, but are relatively movable axially, resilient means urging the members away from each other, means rotatable with the pulley responsive to centrifugal force for moving the members toward each other to various predetermined positions in accordance with the speed of rotation, whereby the effective pitch diameter of the pulley may be increased in response to increase in speed, the last named means including guide means extending outwardly from the axis of the pulley, joined at the outer end thereof the guide means extending substantially parallel with the axis, and a plurality of contacting members having a fixed mass movable along the guide means.

CHARLES H. MINER.

REFERENCES CITED

The following references are of record in the file of this patent:

UNITED STATES PATENTS

| Number | Name | Date |
|---|---|---|
| 2,081,743 | Glen | May 25, 1937 |
| 2,155,351 | Paulus | Apr. 18, 1939 |
| 2,283,267 | Kohl | May 19, 1942 |
| 2,496,061 | Miner | Jan. 31, 1950 |
| 2,496,201 | Dodge | Jan. 31, 1950 |

FOREIGN PATENTS

| Number | Country | Date |
|---|---|---|
| 17,020 | Great Britain | July 22, 1906 |